(12) United States Patent
Huang-Fu

(10) Patent No.: US 11,317,345 B2
(45) Date of Patent: Apr. 26, 2022

(54) METHOD AND APPARATUS FOR DATA NETWORK NAME SELECTION IN MOBILE COMMUNICATIONS

(71) Applicant: MediaTek Inc., Hsinchu (TW)

(72) Inventor: Chien-Chun Huang-Fu, Hsinchu (TW)

(73) Assignee: MediaTek Inc., Taiwan (CN)

( * ) Notice: Subject to any disclaimer, the term of this patent is extended or adjusted under 35 U.S.C. 154(b) by 0 days.

(21) Appl. No.: 16/937,419

(22) Filed: Jul. 23, 2020

(65) Prior Publication Data
US 2021/0058857 A1 Feb. 25, 2021

Related U.S. Application Data

(60) Provisional application No. 62/890,687, filed on Aug. 23, 2019.

(51) Int. Cl.
| | | |
|---|---|---|
| *H04W 4/00* | (2018.01) | |
| *H04W 48/18* | (2009.01) | |
| *H04W 40/02* | (2009.01) | |
| *H04L 41/0893* | (2022.01) | |
| *H04W 80/08* | (2009.01) | |
| *H04W 60/06* | (2009.01) | |

(52) U.S. Cl.
CPC ......... *H04W 48/18* (2013.01); *H04L 41/0893* (2013.01); *H04W 40/02* (2013.01); *H04W 60/06* (2013.01); *H04W 80/08* (2013.01)

(58) Field of Classification Search
CPC ............. H04L 12/2863; H04L 12/4641; H04L 2012/562; H04L 29/08576; H04L 29/08738; H04L 41/12; H04L 45/00; H04L 45/04; H04L 29/06884; H04L 29/08144; H04L 45/30; H04L 45/302; H04L 45/304; H04L 45/306; H04L 48/18; H04L 41/0893; H04W 40/02; H04W 12/102; H04W 60/06; H04W 80/08
USPC ........................................................ 370/329
See application file for complete search history.

(56) References Cited

U.S. PATENT DOCUMENTS

2021/0120596 A1 * 4/2021 Youn ........................ H04W 8/08

* cited by examiner

*Primary Examiner* — Huy C Ho
(74) *Attorney, Agent, or Firm* — Han IP PLLC; Andy M. Han

(57) ABSTRACT

Solutions for data network name (DNN) selection when user equipment (UE) route selection policy (URSP) rule is applied in evolved packet system (EPS) with respect to user equipment and network apparatus in mobile communications are described. An apparatus may start an application in an EPS network. The apparatus may select a URSP rule from one or more configured URSP rules by matching a traffic descriptor (TD) of the URSP rule with the application. The apparatus may determine whether a data network name (DNN) or access point name (APN) included in a route selection descriptor (RSD) is a local area data network (LADN) DNN or APN. The apparatus may skip the RSD in an event that the DNN or APN is the LADN DNN or APN. The apparatus may evaluate a next RSD or a next URSP rule in case that the next RSD or the next URSP rule is available.

20 Claims, 6 Drawing Sheets

200

| Information name | Description | Category | PCF permitted to modify in a UE context | Scope |
|---|---|---|---|---|
| Rule Precedence | Determines the order the URSP rule is enforced in the UE. | Mandatory (NOTE 1) | Yes | UE context |
| Traffic descriptor | *This part defines the Traffic descriptor components for the URSP rule.* | Mandatory (NOTE 3) | | |
| Application descriptors | It consists of OSId and OSAppId(s). (NOTE 2) | Optional | Yes | UE context |
| IP descriptors (NOTE 5) | Destination IP 3 tuple(s) (IP address or IPv6 network prefix, port number, protocol ID of the protocol above IP). | Optional | Yes | UE context |
| Domain descriptors | Destination FQDN(s) or a regular expression as a domain name matching criteria. | Optional | Yes | UE context |
| Non-IP descriptors (NOTE 5) | Descriptor(s) for destination information of non-IP traffic | Optional | Yes | UE context |
| DNN | This is matched against the DNN information provided by the application. | Optional | Yes | UE context |
| Connection Capabilities | This is matched against the information provided by a UE application when it requests a network connection with certain capabilities. (NOTE 4) | Optional | Yes | UE context |
| List of Route Selection Descriptors | A list of Route Selection Descriptors. The components of a Route Selection Descriptor are described in table 6.6.2.1-3. | Mandatory | | |
| NOTE 1: Rules in a URSP shall have different precedence values. | | | | |
| NOTE 2: The information is used to identify the Application(s) that is(are) running on the UE's OS. The OSId does not include an OS version number. The OSAppId does not include a version number for the application. | | | | |
| NOTE 3: At least one of the Traffic descriptor components shall be present. | | | | |
| NOTE 4: The format and some values of Connection Capabilities, e.g. "ims", "mms", "internet", etc., are defined in TS 24.526 [19]. More than one connection capabilities value can be provided. | | | | |
| NOTE 5: A URSP rule cannot contain the combination of the Traffic descriptor components IP descriptors and Non-IP descriptors. | | | | |

FIG. 2

| Information name | Description | Category | PCF permitted to modify in URSP | Scope |
|---|---|---|---|---|
| Route Selection Descriptor Precedence | Determines the order in which the Route Selection Descriptors are to be applied. | Mandatory (NOTE 1) | Yes | UE context |
| Route selection components | *This part defines the route selection components* | Mandatory (NOTE 2) | | |
| SSC Mode Selection | One single value of SSC mode. (NOTE 5) | Optional | Yes | UE context |
| Network Slice Selection | Either a single value or a list of values of S-NSSAI(s). | Optional (NOTE 3) | Yes | UE context |
| DNN Selection | Either a single value or a list of values of DNN(s). | Optional | Yes | UE context |
| PDU Session Type Selection | One single value of PDU Session Type | Optional (NOTE 8) | Yes | UE context |
| Non-Seamless Offload indication | Indicates if the traffic of the matching application is to be offloaded to non-3GPP access outside of a PDU Session. | Optional (NOTE 4) | Yes | UE context |
| Access Type preference | Indicates the preferred Access Type (3GPP or non-3GPP or Multi-Access) when the UE establishes a PDU Session for the matching application. | Optional | Yes | UE context |
| Route Selection Validation Criteria (NOTE 6) | *This part defines the Route Validation Criteria components* | Optional | | |
| Time Window | The time window when the matching traffic is allowed. The RSD is not considered to be valid if the current time is not in the time window. | Optional | Yes | UE context |
| Location Criteria | The UE location where the matching traffic is allowed. The RSD rule is not considered to be valid if the UE location does not match the location criteria. | Optional | Yes | UE context |
| NOTE 1: Every Route Selection Descriptor in the list shall have a different precedence value. NOTE 2: At least one of the route selection components shall be present. NOTE 3: When the Subscription Information contains only one S-NSSAI in UDR, the PCF needs not provision the UE with S-NSSAI in the Network Slice Selection information. The "match all" URSP rule has one S-NSSAI at most. | | | | |

FIG. 3

METHOD AND APPARATUS FOR DATA NETWORK NAME SELECTION IN MOBILE COMMUNICATIONS

CROSS REFERENCE TO RELATED PATENT APPLICATION(S)

The present disclosure is part of a non-provisional application claiming the priority benefit of U.S. Patent Application No. 62/890,687, filed on 23 Aug. 2019, the content of which being incorporated by reference in its entirety.

TECHNICAL FIELD

The present disclosure is generally related to mobile communications and, more particularly, to data network name (DNN) selection when user equipment (UE) route selection policy (URSP) rule is applied in evolved packet system (EPS) with respect to user equipment and network apparatus in mobile communications.

BACKGROUND

Unless otherwise indicated herein, approaches described in this section are not prior art to the claims listed below and are not admitted as prior art by inclusion in this section.

The UE policies for $5^{th}$ generation system (5GS) include URSP and access network discovery and selection policy (ANDSP). The UE policies can be delivered form a policy control function (PCF) to the UE. The PCF takes care of network policies to manage network behavior. The PCF gets the subscription information from unified data management (UDM). The PCF interfaces to both access and mobility function (AMF) to manage the mobility context and session management function (SMF) to manage the session contexts. The PCF also plays a crucial role in providing a schema for network slicing and roaming. The PCF triggers the URSP which enables the UE to determine how a certain application should be handled in the context of an existing or new protocol data unit (PDU) session. The UE policies can also be pre-configured in the UE. The pre-configured policy should be applied by the UE only when the UE has not received the same type of policy from the PCF.

A PDU session defines the association between the UE and the data network that provides a PDU connectivity service. Each PDU session is identified by a PDU session ID, and includes one or more quality of service (QoS) flows and QoS rules. When the upper layers request information of the PDU session via which to send a PDU of an application, the UE should evaluate the URSP rules, except the default URSP rule, with a traffic descriptor matching the application information in increasing order of their precedence values. If the UE finds the traffic descriptor in a non-default URSP rule matching the application information, and an established PDU session matching at least one of the route selection descriptors of the URSP rule, the UE then provides information on the PDU session that matches the route selection descriptor of the lowest precedence value to the upper layers. Otherwise the UE selects a route selection descriptor with the next smallest precedence value which has not been evaluated.

It is agreed in the 3GPP specification that the 5GS URSP rules may be applied to EPS PDN connection as well. When the UE is in EPS, after inter-system change from 5GS to EPS, the UE is allowed to use the URSP rules, to derive corresponding parameters for establishing PDN connections when UE is attached to Evolved Packet Core (EPC). However, the DNN included in the route selection descriptor might be a local area data network (LADN) DNN. The LADN DNN is not defined in the EPS and thus the UE handling for the LADN DNN is not specified. It is not clear to the UE how to handle the LADN DNN when it is detected. The UE behavior is undefined that could cause error or malfunction when performing the URSP matching procedure in EPS.

Accordingly, how to design clear procedures to avoid error or malfunction when the URSP rule is applied in EPS network becomes an important issue in the newly developed wireless communication network. Therefore, there is a need to provide proper schemes to proceed the URSP matching procedure when the LADN DNN is detected.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to DNN selection when URSP rule is applied in EPS with respect to user equipment and network apparatus in mobile communications.

In one aspect, a method may involve an apparatus starting an application in an EPS network. The method may also involve the apparatus selecting a URSP rule from one or more configured URSP rules by matching a traffic descriptor of the URSP rule with the application. The method may further involve the apparatus determining whether a DNN or access point name (APN) included in a route selection descriptor is a LADN DNN or APN. The method may further involve the apparatus skipping the RSD in an event that the DNN or APN is the LADN DNN or APN. Then, the method may involve the apparatus evaluating a next RSD or a next URSP rule in an event that the next RSD or the next URSP rule is available.

In one aspect, an apparatus may comprise a transceiver which, during operation, wirelessly communicates with a network node of a wireless network. The apparatus may also comprise a processor communicatively coupled to the transceiver. The processor, during operation, may perform operations comprising starting an application in an EPS network. The processor may also perform operations comprising selecting a URSP rule from one or more configured URSP rules by matching a traffic descriptor of the URSP rule with the application. The processor may further perform operations comprising determining whether a DNN or APN included in a route selection descriptor is a LADN DNN or APN. The processor may further perform operations comprising skipping the RSD in an event that the DNN or APN is the LADN DNN or APN. Then, the processor may perform operations comprising evaluating a next RSD or a next URSP rule in an event that the next RSD or the next URSP rule is available.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT), Narrow Band Internet of Things (NB-IoT) and Industrial Internet of Things (IIoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 2 is a table illustrating the content of a URSP rule as defined in 3GPP specification.

FIG. 3 is a table illustrating the content of a route selection descriptor as defined in 3GPP specification.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to DNN selection when URSP rule is applied in EPS with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

Figure 1:
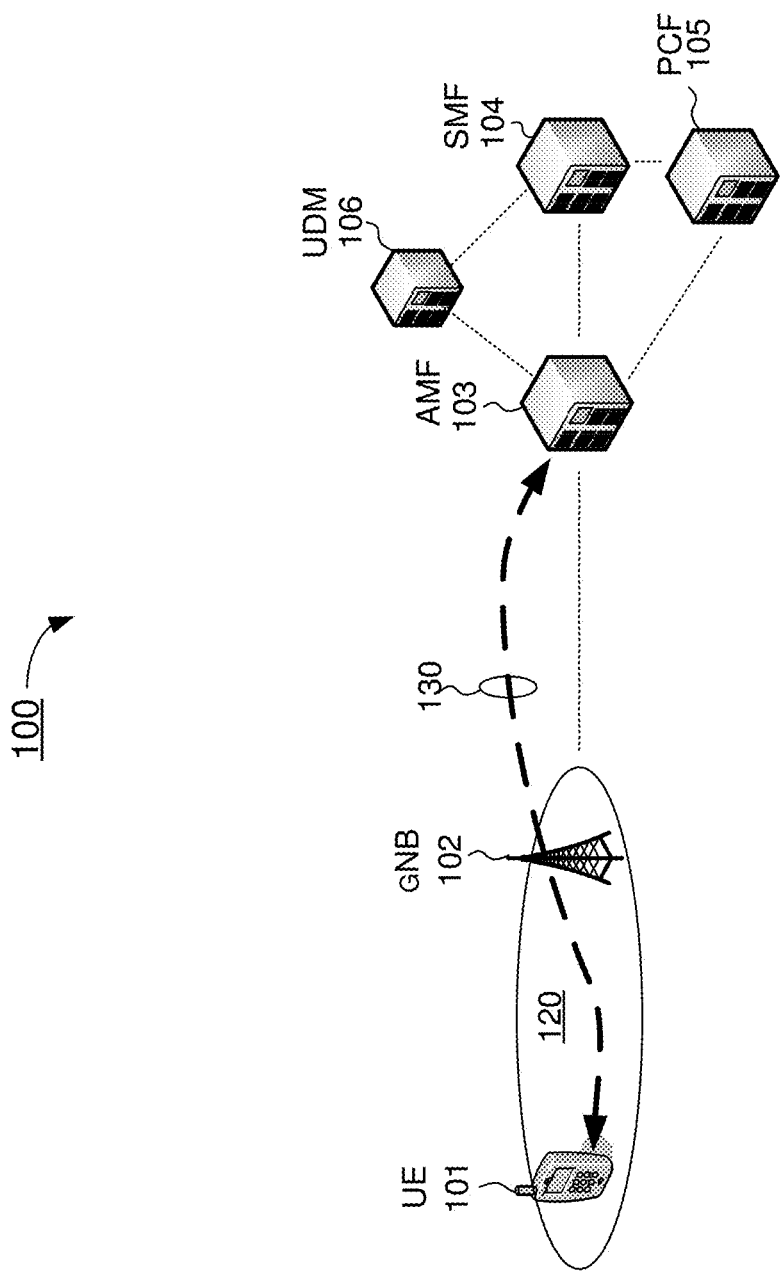
FIG. 1 is a diagram depicting an exemplary 5G network supporting URSP rule matching in accordance with implementations of the present disclosure.

FIG. 1 illustrates an exemplary 5G network 100 supporting URSP rule matching in accordance with implementations of the present disclosure. 5G NR network 100 may comprise a UE 101, a base station gNB 102, an access and mobility management function (AMF) 103, a session management function (SMF) 104, a policy control function (PCF) 105, and a unified data management (UDM) 106. In the example of FIG. 1, UE 101 and its serving base station gNB 102 belong to part of a radio access network (RAN) 120. In the access stratum (AS) layer, RAN 120 may provide radio access for UE 101 via a radio access technology (RAT). In non-access stratum (NAS) layer, AMF 103 may communicate with gNB 102, SMF 104, PCF 105 and UDM 106 for access and mobility management of wireless access devices in 5G network 100. UE 101 may be equipped with a radio frequency (RF) transceiver or multiple RF transceivers for different application services via different RATs/core networks (CNs). UE 101 may be implemented as a smart phone, a wearable device, an Internet of Things (IoT) device, a tablet, a vehicle, etc.

5GS networks are packet-switched (PS) Internet Protocol (IP) networks. This means that the networks deliver all data traffic in IP packets, and provide users with always-on IP connectivity. When the UE joins a 5GS network, a packet data network (PDN) address (i.e., the one that can be used on the PDN) is assigned to the UE for its connection to the PDN. In 4G, EPS has defined a default EPS bearer to provide the IP connectivity that is always-on. In 5G, a PDU session establishment procedure is a parallel procedure of a PDN connection procedure in 4G. A PDU session (e.g., 130) defines the association between the UE and the data network that provides a PDU connectivity service. Each PDU session is identified by a PDU session ID, and may include multiple QoS flows and QoS rules.

The UE policies for 5GS include URSP and ANDSP. The URSP may be used by the UE to determine how to route outgoing traffic. For example, traffic can be routed to an established PDU Session, can be offloaded to non-3GPP access outside a PDU Session, or can trigger the establishment of a new PDU Session. The ANDSP may be used by the UE for selecting non-3GPP accesses network. The UE policies can be delivered form the PCF to the UE. The PCF takes care of network policies to manage network behavior. The PCF gets the subscription information from the UDM. PCF interfaces to both the AMF to manage the mobility context and the SMF to manage the session contexts. The PCF also plays a crucial role in providing a scheme for network slicing and roaming. The PCF triggers the URSP which enables the UE to determine how a certain application should be handled in the context of an existing or new PDU session. The UE policies may also be pre-configured in UE. The pre-configured policy should be applied by UE only when UE has not received the same type of policy from the PCF.

When the UE starts an application, UE upper layers may trigger URSP rule matching. The UE may evaluate the URSP rules, except the default URSP rule, with a traffic descriptor (TD) matching the application information in increasing order of their precedence values. In an event that the UE finds the TD in a non-default URSP rule matching the application information, and an established PDU session matching at least one of the route selection descriptors (RSDs) of the URSP rule, the UE may provide information of the PDU session that matches the route selection descriptor of the lowest precedence value to the upper layers. Otherwise the UE may select an route selection descriptor with the next smallest precedence value which has not been evaluated.

If no non-default matching URSP rule can be found and if UE local configuration for the application is available, the UE should perform the association of the application to a PDU session accordingly. If no matching PDU session exists, the UE NAS layer should attempt to establish a PDU session using UE local configuration. If the PDU session establishment is successful, the UE NAS layer should provide information of the successfully established PDU session to the upper layers. Otherwise, if no non-default matching URSP rule can be found and if either UE local configuration for the application is not available or the PDU session establishment based on UE local configuration for the application fails, the UE should perform the association of the application to a PDU session or to non-seamless non-3GPP offload according to the default URSP rule with the "match-all" TD. If the association is unsuccessful, the UE may inform the upper layers of the failure.

FIG. 2 illustrates the content of a URSP rule as defined in 3GPP specification. The URSP is defined as a set of one or more URSP rules. As depicted by Table 200, each URSP rule is composed of: 1) a precedence value of the URSP rule (e.g., Rule Precedence) identifying the precedence of the URSP rule among all the existing URSP rules; 2) a traffic descriptor; and 3) one or more route selection descriptors. The traffic descriptor includes at least one of the following components: A) one or more application identifiers; B) one or more IP 3 tuples (i.e., the destination IP address, the destination port number, and the protocol used above the IP); C) one or more domain descriptors (i.e., destination fully qualified domain name (FQDN)); D) one or more non-IP descriptors (i.e., destination information of non-IP traffic); E) one or more DNNs; and F) one or more connection capabilities. Only one URSP rule in the URSP can be a default URSP rule and the default URSP rule should contain a match-all traffic descriptor. If a default URSP rule and one or more non-default URSP rules are included in the URSP, any non-default URSP rule should have lower precedence value (i.e., higher priority) than the default URSP rule.

FIG. 3 illustrates the content of a route selection descriptor as defined in 3GPP specification. The route selection descriptor is defined as a set of one or more route selection descriptors. As depicted by Table 300, each route selection descriptor includes a precedence value of the route selection descriptor (e.g., Route Selection Descriptor Precedence) and one or more of the followings: A) SSC mode; B) one or more Single Network Slice Selection Assistance Information (S-NSSAIs); C) one or more DNNs; D) one PDU session type; E) non-seamless offload indication; F) preferred access type; and G) route selection validation criteria.

Figure 4:
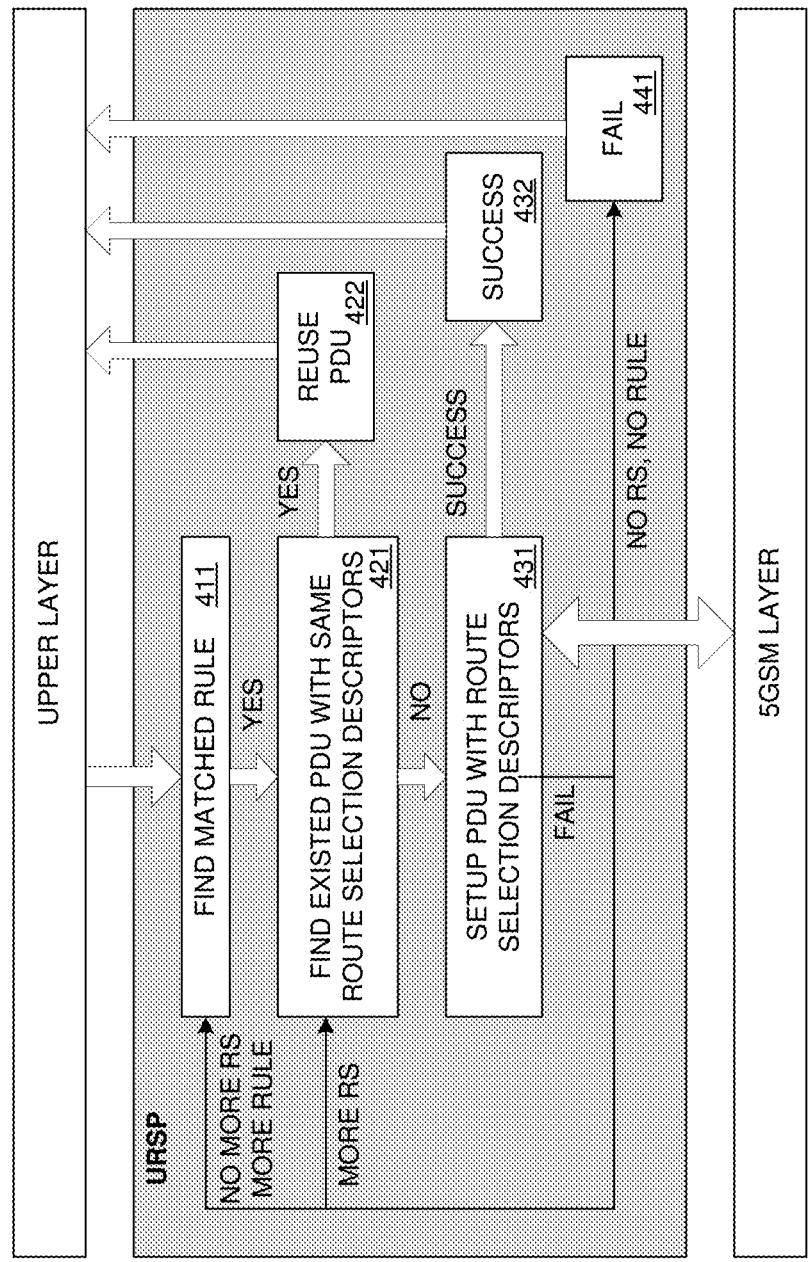
FIG. 4 is a diagram depicting different layers inside a UE for supporting URSP rule matching in accordance with implementations of the present disclosure.

FIG. 4 illustrates different layers inside a UE for supporting URSP rule matching in accordance with implementations of the present disclosure. The URSP is used by the UE to determine if a detected application can be associated to an established PDU session, can be offload to non-3GPP access outside a PDU session, or can trigger the establishment of a new PDU session. A URSP rule may include one traffic descriptor that specifies the matching criteria and one or more of the following components: SSC mode selection policy to associated the matching application with SSC mode, network slice selection policy to associated the matching application with S-NSSAI, DNN selection policy to associated the matching application with DNN, PDU session type policy to associated the matching application with a PDU session type, non-seamless offload policy to determine that the matching application should be non-seamlessly offloaded to non-3GPP access (i.e., out of a PDU session), and access type preference indicating a preferred access (3GPP or non-3GPP) when UE needs to establish a new PDU session for the matching application.

In the embodiment of FIG. 4, to determine association between an application and a PDU session or non-seamless non-3GPP offload, UE upper layers may proceed with URSP rule matching. In step 411, in increasing order of their precedence values, the UE may evaluate the URSP rules, except the default URSP rule, with a traffic descriptor matching the application information. For example, an application identifier included in the traffic descriptor matches with an application ID of the application. Is should be noted that if the traffic descriptor contains more than one component, then all of them need to be matched with the application information.

In an event that the UE finds the traffic descriptor in a non-default URSP rule matching the application information, in step 421, UE may try to determine whether one or more PDU sessions that match at least one of the route selection descriptors of the URSP rule can be found. If the answer is yes, then UE may reuse the existing PDU session in step 422 and provide information on the PDU session that matches the route selection descriptor of the lowest precedence value to the upper layers. If the answer is no, then the UE may go to step 431 and the UE 5GSM layer may try to setup PDU with the same route selection descriptors. If the PDU session is successfully established, then the UE may go to step 432 and provides information on the newly established PDU session. Specifically, the UE NAS layer may indicate the attributes of the established PDU session (e.g., PDU session ID, SSC mode, S-NSSAI, DNN, PDU session type, access type, PDU address) to the URSP handling layer, and provides information (e.g., PDU address) of the established PDU session to the upper layers.

Otherwise, if step 431 fails, and if there are more route selection descriptors, UE may select a route descriptor with the next smallest precedence value which has not been evaluated and go to step 421. If no more route selection descriptors for the URSP rule, then the UE may go back to step 411 and try to find a next non-default URSP rule having the next smallest precedence value, and with a traffic descriptor that matches the application information. The UE then continues with step 421 and step 431 to find the suitable PDU session for the next non-default URSP rule. If step 431 fails for all non-default URSP rule, then the UE may inform the upper layers of the failure in step 441. If all non-default URSP rules cannot be matched with the application, then the UE may try the default URSP rule, which includes a match-all traffic descriptor.

It is agreed in the 3GPP specification that the 5G URSP rules may be applied to 4G PDN connection as well. When the UE is in EPS, after inter-system change from 5GS to EPS, the UE is allowed to use the URSP rules, to derive corresponding parameters for establishing PDN connections when UE is attached to EPC. However, the DNN included in the route selection descriptor might be a LADN DNN. The LADN DNN is not defined in the EPS and thus the UE handling for the LADN DNN is not specified. It is not clear to the UE how to handle the LADN DNN when it is detected. Therefore, the present disclosure proposes a number of schemes pertaining to DNN selection when the URSP rule is applied in EPS with respect to the UE and the network apparatus. According to the schemes of the present disclosure, the UE may be able to properly proceed the URSP matching procedure in EPS.

Specifically, when the UE starts an application in the EPS network, the UE may be configured to select a URSP rule from one or more configured URSP rules by matching a traffic descriptor of the URSP rule with the application. Then, the UE may determine whether a DNN or APN included in a route selection descriptor is a LADN DNN or APN. In an event that the DNN or APN is the LADN DNN or APN, the UE may be configured to skip the current route selection descriptor. Then, the UE may be configured to a next route selection descriptor or a next URSP rule in an event that the next route selection descriptor or the next URSP rule is available. In an event that no more route selection descriptor or URSP rule is available, the UE may further be configured to inform a failure to the upper layer.

In some implementation, the UE may select the route selection descriptor by taking UE's registration status into consideration. In matching a traffic descriptor of the URSP rule with the application, the UE may match application information of the application with the traffic descriptor in the URSP rule. In determining whether a DNN or APN is a LADN DNN or APN, the UE may determine whether a DNN selection parameter included in the route selection descriptor contains at least one LDAN DNN or APN. After matching one of route selection descriptors of the URSP rules, the UE may further associating the application with the PDU session or PDN connection and provide the information of the PDU session or PDN connection to the upper layer.

Alternatively, after detecting that a DNN/APN is a LADN DNN/APN, the UE may determine whether it is in the LADN service area. The UE may use this LADN DNN/APN to establish a PDN connection when the UE is in the LADN service area. The network may provide the LADN information to the UE in corresponding NAS messages.

In some implementations, the UE may be configured to determine whether a preferred access type included in the route selection descriptor is identical to an access type currently registered. In an event that the preferred access type is not the access type currently registered, the UE may be configured to skip this route selection descriptor or take this route selection descriptor as not available. The UE may try to evaluate a next route selection descriptor or URSP rule in an event that the next route selection descriptor or the next URSP rule is available. Alternatively, when the preferred access type is not the access type currently registered, the UE may try to register over the preferred access type and try to establish the PDU session/PDN connection. For example, the UE may be configured to select the route selection descriptor where a preferred access type is included. Then, the UE may try to register over the preferred access type and establish a PDU session or PDN connection. In an event that both the registration and the establishment are successful, the UE may provide information of the PDU session or PDN connection to the upper layer. In an event that the registration is failed or the registration is successful but the establishment is failed, the UE may inform the failure to the upper layer. Optionally, the UE may further deregister from the preferred access type in an event that the PDU session or PDN connection cannot be established successfully.

Illustrative Implementations

Figure 5:
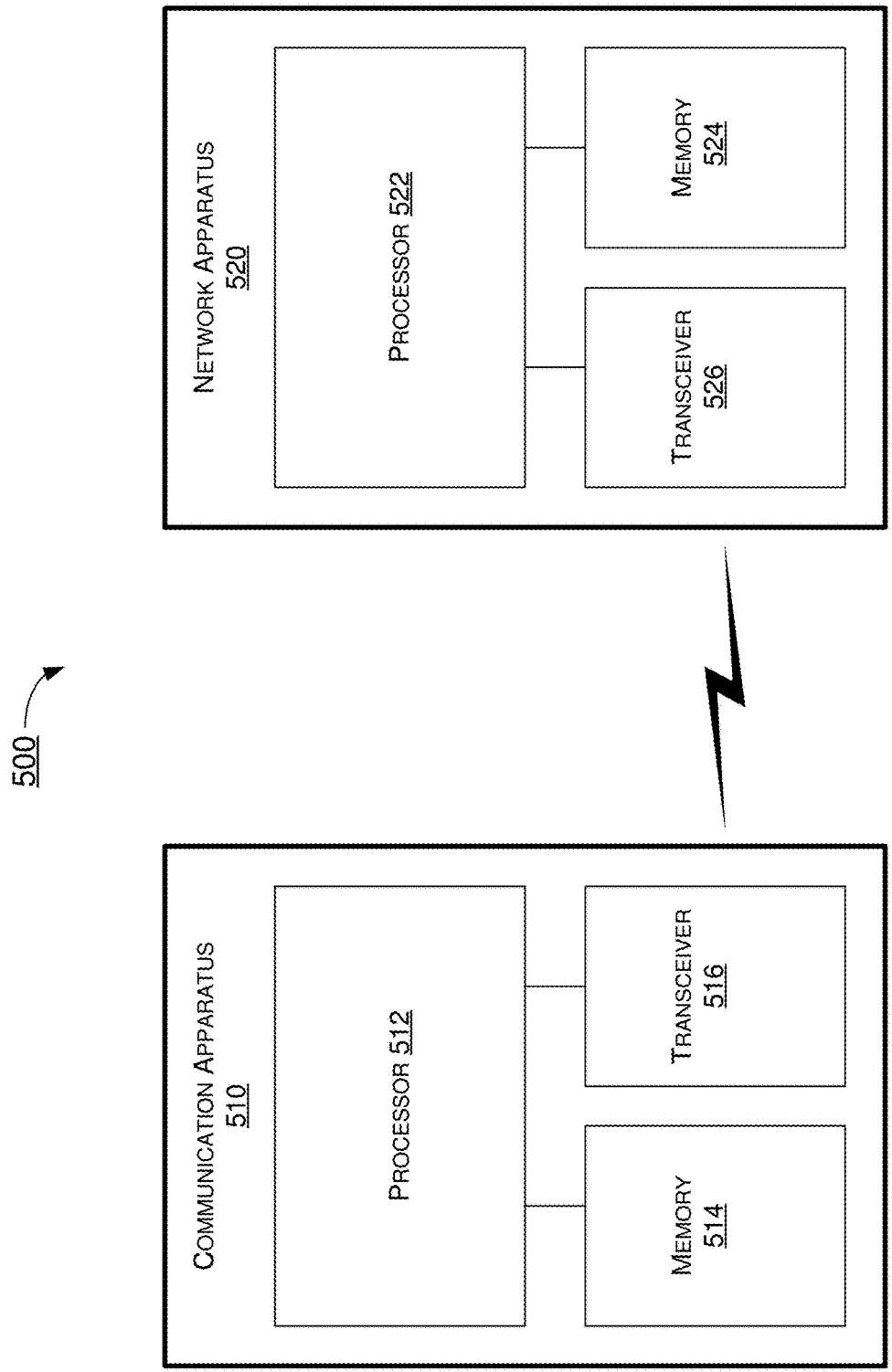
FIG. 5 is a block diagram of an example communication apparatus and an example network apparatus in accordance with an implementation of the present disclosure.

FIG. 5 illustrates an example communication apparatus 510 and an example network apparatus 520 in accordance with an implementation of the present disclosure. Each of communication apparatus 510 and network apparatus 520 may perform various functions to implement schemes, techniques, processes and methods described herein pertaining to DNN selection when URSP rule is applied in EPS with respect to user equipment and network apparatus in wireless communications, including schemes described above as well as process 600 described below.

Communication apparatus 510 may be a part of an electronic apparatus, which may be a UE such as a portable or mobile apparatus, a wearable apparatus, a wireless communication apparatus or a computing apparatus. For instance, communication apparatus 510 may be implemented in a smartphone, a smartwatch, a personal digital assistant, a digital camera, or a computing equipment such as a tablet computer, a laptop computer, a notebook computer or a vehicle. Communication apparatus 410 may also be a part of a machine type apparatus, which may be an IoT, NB-IoT, or IIoT apparatus such as an immobile or a stationary apparatus, a home apparatus, a wire communication apparatus or a computing apparatus. Alternatively, communication apparatus 510 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 510 may include at least some of those components shown in FIG. 5 such as a processor 512, for example. Processor 512 may further comprise protocol stacks and a set of system modules and circuits which may be implemented and configured by software, firmware, hardware, and/or combination thereof. The function modules and circuits, when executed by the processors via program instructions contained in memory 514, interwork with each other to allow communication apparatus 510 to perform embodiments and functional tasks and features in the network. For example, system modules and circuits may comprise a PDU session handling circuit that performs PDU session establishment and modification procedures with network apparatus 520, a policy control circuit that performs URSP rule matching, and a configuration and control circuit that handles configuration and control parameters for mobility management and session management. Communication apparatus 510 may further include one or more other components not pertinent to the proposed scheme of the present disclosure (e.g., internal power supply, display device and/or user interface device), and, thus, such component(s) of communication apparatus 510 are neither shown in FIG. 5 nor described below in the interest of simplicity and brevity.

Network apparatus 520 may be a part of an electronic apparatus, which may be a network node such as a base station, a small cell, a router or a gateway. For instance, network apparatus 520 may be implemented in an eNodeB in an LTE, LTE-Advanced or LTE-Advanced Pro network or in a gNB in a 5G, NR, IoT, NB-IoT, IIoT or V2X network. Alternatively, network apparatus 520 may be implemented in the form of one or more IC chips such as, for example and without limitation, one or more single-core processors, one or more multi-core processors, or one or more RISC or CISC processors. Network apparatus 520 may include at least some of those components shown in FIG. 5 such as a processor 522, for example. Processor 522 may further include protocol stacks and a set of control functional modules and circuit. For example, a PDU session handling circuit may handle PDU session establishment and modification procedures. A policy control circuit may configure policy rules for communication apparatus 510. A configuration and control circuit may provide different parameters to configure and control communication apparatus 510 of related functionalities including mobility management and session management. Network apparatus 520 may further include one or more other components not pertinent to the proposed scheme of the present disclosure (e.g., internal power supply, display device and/or user interface device), and, thus, such component(s) of network apparatus 520 are neither shown in FIG. 5 nor described below in the interest of simplicity and brevity.

In one aspect, each of processor 512 and processor 522 may be implemented in the form of one or more single-core processors, one or more multi-core processors, or one or more CISC processors. That is, even though a singular term "a processor" is used herein to refer to processor 512 and processor 522, each of processor 512 and processor 522 may include multiple processors in some implementations and a single processor in other implementations in accordance with the present disclosure. In another aspect, each of processor 512 and processor 522 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 512 and processor 522 is a special-purpose machine specifically designed, arranged and configured to perform specific tasks in a device (e.g., as represented by communication apparatus 510) and a network (e.g., as represented by network apparatus 520) in accordance with various implementations of the present disclosure.

In some implementations, communication apparatus 510 may also include a transceiver 516 coupled to processor 512 and capable of wirelessly transmitting and receiving data. In some implementations, communication apparatus 510 may further include a memory 514 coupled to processor 512 and capable of being accessed by processor 512 and storing data therein. In some implementations, network apparatus 520 may also include a transceiver 526 coupled to processor 522 and capable of wirelessly transmitting and receiving data. In some implementations, network apparatus 520 may further include a memory 524 coupled to processor 522 and capable of being accessed by processor 522 and storing data therein. Accordingly, communication apparatus 510 and network apparatus 520 may wirelessly communicate with each other via transceiver 516 and transceiver 526, respectively. To aid better understanding, the following description of the operations, functionalities and capabilities of each of communication apparatus 510 and network apparatus 520 is provided in the context of a mobile communication environment in which communication apparatus 510 is implemented in or as a communication apparatus or a UE and network apparatus 520 is implemented in or as a network node of a communication network.

In some implementations, when processor 512 starts an application in the EPS network, processor 512 may be configured to select a URSP rule from one or more configured URSP rules by matching a traffic descriptor of the URSP rule with the application. Then, processor 512 may determine whether a DNN or APN included in a route selection descriptor is a LADN DNN or APN. In an event that the DNN or APN is the LADN DNN or APN, processor 512 may be configured to skip the current route selection descriptor. Then, processor 512 may be configured to a next route selection descriptor or a next URSP rule in an event that the next route selection descriptor or the next URSP rule is available. In an event that no more route selection descriptor or URSP rule is available, processor 512 may further be configured to inform a failure to the upper layer.

In some implementation, processor 512 may select the route selection descriptor by taking a registration status into consideration.

In some implementation, processor 512 may match application information of the application with the traffic descriptor in the URSP rule.

In some implementation, processor 512 may determine whether a DNN selection parameter included in the route selection descriptor contains at least one LDAN DNN or APN.

In some implementation, after matching one of route selection descriptors of the URSP rules, processor 512 may further associating the application with the PDU session or PDN connection and provide the information of the PDU session or PDN connection to the upper layer.

In some implementation, after detecting that a DNN/APN is a LADN DNN/APN, processor 512 may determine whether it is in the LADN service area. Processor 512 may use this LADN DNN/APN to establish a PDN connection when the UE is in the LADN service area. Network apparatus 520 may provide the LADN information to communication apparatus 510 in corresponding NAS messages.

In some implementations, processor 512 may be configured to determine whether a preferred access type included in the route selection descriptor is identical to an access type currently registered. In an event that the preferred access type is not the access type currently registered, processor 512 may be configured to skip this route selection descriptor or take this route selection descriptor as not available. Processor 512 may try to evaluate a next route selection descriptor or URSP rule in an event that the next route selection descriptor or the next URSP rule is available.

In some implementations, when the preferred access type is not the access type currently registered, processor 512 may try to register over the preferred access type and try to establish the PDU session/PDN connection. For example, processor 512 may be configured to select the route selection descriptor where a preferred access type is included. Then, processor 512 may try to register over the preferred access type and establish a PDU session or PDN connection. In an event that both the registration and the establishment are successful, processor 512 may provide information of the PDU session or PDN connection to the upper layer. In an event that the registration is failed or the registration is successful but the establishment is failed, processor 512 may inform the failure to the upper layer. Optionally, processor 512 may further deregister from the preferred access type in an event that the PDU session or PDN connection cannot be established successfully.

Illustrative Processes

Figure 6:
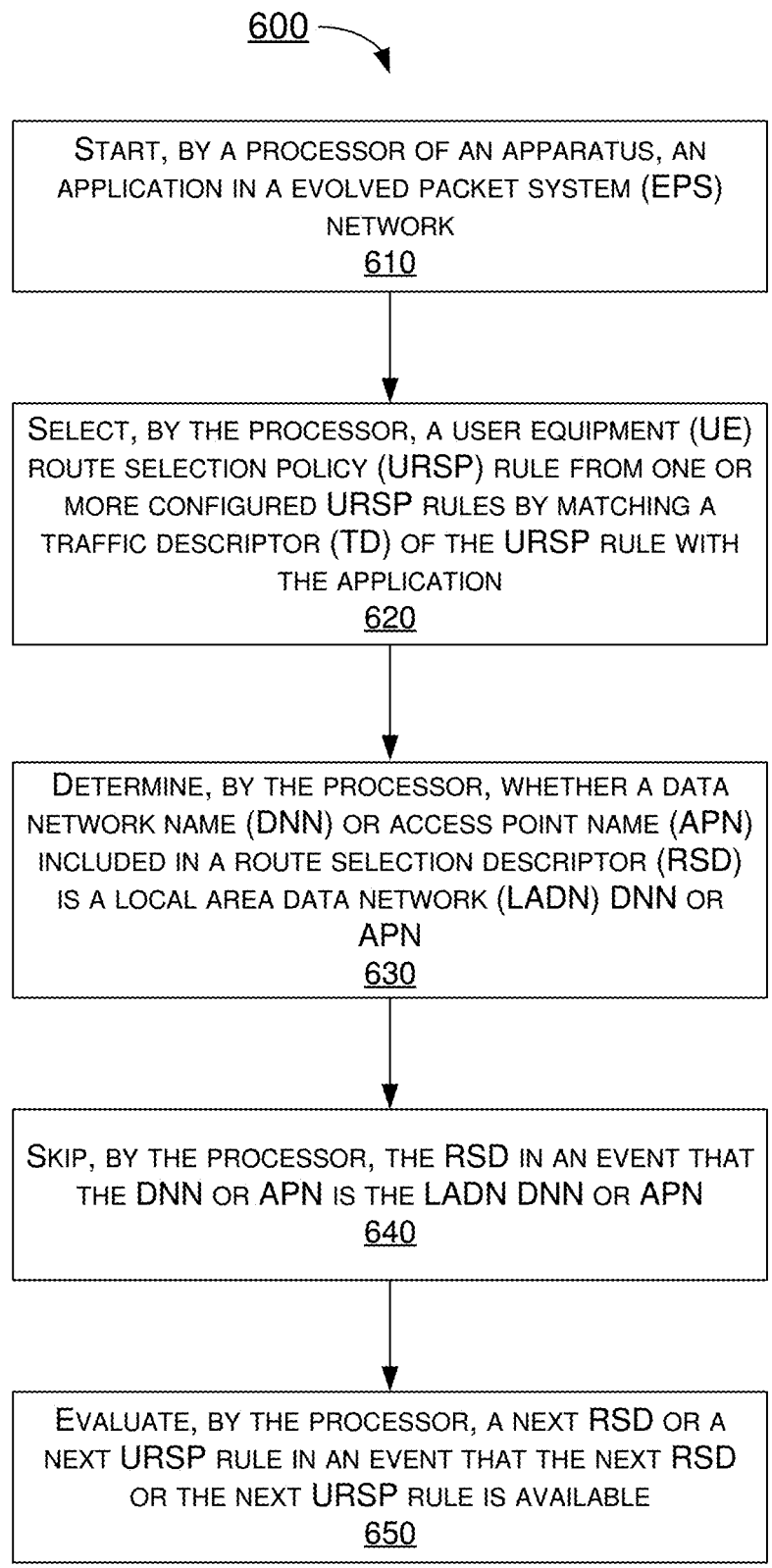
FIG. 6 is a flowchart of an example process in accordance with an implementation of the present disclosure.

FIG. 6 illustrates an example process 600 in accordance with an implementation of the present disclosure. Process 600 may be an example implementation of above scenarios/schemes, whether partially or completely, with respect to DNN selection when URSP rule is applied in EPS with the present disclosure. Process 600 may represent an aspect of implementation of features of communication apparatus 510. Process 600 may include one or more operations, actions, or functions as illustrated by one or more of blocks 610, 620, 630, 640 and 650. Although illustrated as discrete blocks, various blocks of process 600 may be divided into additional blocks, combined into fewer blocks, or eliminated, depending on the desired implementation. Moreover, the blocks of process 600 may executed in the order shown in FIG. 6 or, alternatively, in a different order. Process 600 may be implemented by communication apparatus 510, any suitable UE or machine type devices. Solely for illustrative purposes and without limitation, process 600 is described below in the context of n communication apparatus 510. Process 600 may begin at block 610.

At 610, process 600 may involve processor 512 of apparatus 510 starting, by a processor of an apparatus, an application in an EPS network. Process 600 may proceed from 610 to 620.

At 620, process 600 may involve processor 512 selecting a URSP rule from one or more configured URSP rules by matching a traffic descriptor of the URSP rule with the application. Process 600 may proceed from 620 to 630.

At 630, process 600 may involve processor 512 determining whether a DNN or APN included in a route selection descriptor is a LADN DNN or APN. Process 600 may proceed from 630 to 640.

At 640, process 600 may involve processor 512 skipping the route selection descriptor in an event that the DNN or APN is the LADN DNN or APN. Process 600 may proceed from 640 to 650.

At 650, process 600 may involve processor 512 evaluate a next route selection descriptor or a next URSP rule in an event that the next route selection descriptor or the next URSP rule is available.

In some implementations, process 600 may involve processor 512 performing an inter-system change from a 5G system to the EPS network.

In some implementations, process 600 may involve processor 512 selecting the route selection descriptor by taking a registration status into consideration.

In some implementations, process 600 may involve processor 512 informing a failure to an upper layer in an event that no more route selection descriptor or URSP rule is available.

In some implementations, process 600 may involve processor 512 determining whether a DNN selection parameter included in the route selection descriptor contains at least one LDAN DNN or APN.

In some implementations, process 600 may involve processor 512 associating the application with a PDU session or PDN connection matching one of route selection descriptors of the URSP rules. Process 600 may further involve processor 512 providing information of the PDU session or PDN connection to an upper layer.

In some implementations, process 600 may involve processor 512 determining whether a preferred access type included in the route selection descriptor is identical to an access type currently registered. Process 600 may further involve processor 512 skipping the route selection descriptor in an event that the preferred access type is not the access type currently registered.

In some implementations, process 600 may involve processor 512 selecting the route selection descriptor where a preferred access type is included. Process 600 may also involve processor 512 registering over the preferred access type. Process 600 may further involve processor 512 establishing a PDU session or PDN connection.

In some implementations, process 600 may involve processor 512 providing information of the PDU session or PDN connection to an upper layer in an event that both the registering and the establishing are successful.

In some implementations, process 600 may involve processor 512 informing a failure to an upper layer in an event that the registering is failed or the registering is successful but the establishing is failed. Process 600 may further involve processor 512 deregistering from the preferred access type in an event that the establishing is failed.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    starting, by a processor of an apparatus, an application in an evolved packet system (EPS) network;
    selecting, by the processor, a user equipment (UE) route selection policy (URSP) rule from one or more configured URSP rules by matching a traffic descriptor (TD) of the URSP rule with the application;
    determining, by the processor, whether an access point name (APN) included in a route selection descriptor (RSD) is a local area data network (LADN) APN;
    skipping, by the processor, the RSD in an event that the APN is the LADN APN; and
    evaluating, by the processor, a next RSD or a next URSP rule in an event that the next RSD or the next URSP rule is available.

2. The method of claim 1, further comprising:
    performing, by the processor, an inter-system change from a $5^{th}$ Generation (5G) system to the EPS network.

3. The method of claim 1, further comprising:
    selecting, by the processor, the RSD by taking a registration status into consideration.

4. The method of claim 1, further comprising:
    informing, by the processor, a failure to an upper layer in an event that no more RSD or URSP rule is available.

5. The method of claim 1, wherein the determining comprises determining whether a data network name (DNN) selection parameter included in the RSD contains at least one LDAN DNN or APN.

6. The method of claim 1, further comprising:
    associating, by the processor, the application with a protocol data unit (PDU) session or packet data network (PDN) connection matching one of RSDs of the URSP rules; and
    providing, by the processor, information of the PDU session or PDN connection to an upper layer.

7. The method of claim 1, further comprising:
    determining, by the processor, whether a preferred access type included in the RSD is identical to an access type currently registered; and
    skipping, by the processor, the RSD in an event that the preferred access type is not the access type currently registered.

8. The method of claim 1, further comprising:
    selecting, by the processor, the RSD where a preferred access type is included;
    registering, by the processor, over the preferred access type; and
    establishing, by the processor, a protocol data unit (PDU) session or packet data network (PDN) connection.

9. The method of claim 8, further comprising:
    providing, by the processor, information of the PDU session or PDN connection to an upper layer in an event that both the registering and the establishing are successful.

10. The method of claim 8, further comprising:
    informing, by the processor, a failure to an upper layer in an event that the registering is failed or the registering is successful but the establishing is failed; and
    deregistering, by the processor, from the preferred access type in an event that the establishing is failed.

11. An apparatus, comprising:
    a transceiver which, during operation, wirelessly communicates with network nodes of a wireless network; and
    a processor communicatively coupled to the transceiver such that, during operation, the processor performs operations comprising:
        starting an application in an evolved packet system (EPS) network;
        selecting a user equipment (UE) route selection policy (URSP) rule from one or more configured URSP rules by matching a traffic descriptor (TD) of the URSP rule with the application;
        determining whether an access point name (APN) included in a route selection descriptor (RSD) is a local area data network (LADN) APN;
        skipping the RSD in an event that the APN is the LADN APN; and
        evaluating a next RSD or a next URSP rule in an event that the next RSD or the next URSP rule is available.

12. The apparatus of claim 11, wherein, during operation, the processor further performs operations comprising:
    performing an inter-system change from a 5th Generation (5G) system to the EPS network.

13. The apparatus of claim 11, wherein, during operation, the processor further performs operations comprising:
    selecting the RSD by taking a registration status into consideration.

14. The apparatus of claim 11, wherein, during operation, the processor further performs operations comprising:
    informing a failure to an upper layer in an event that no more RSD or URSP rule is available.

15. The apparatus of claim 11, wherein, in determining whether the APN included in the RSD is the LADN APN, the processor determines whether a data network name (DNN) selection parameter included in the RSD contains at least one LDAN DNN or APN.

16. The apparatus of claim 11, wherein, during operation, the processor further performs operations comprising:
    associating the application with a protocol data unit (PDU) session or packet data network (PDN) connection matching one of RSDs of the URSP rules; and
    providing information of the PDU session or PDN connection to an upper layer.

17. The apparatus of claim 11, wherein, during operation, the processor further performs operations comprising:
    determining whether a preferred access type included in the RSD is identical to an access type currently registered; and
    skipping the RSD in an event that the preferred access type is not the access type currently registered.

18. The apparatus of claim 11, wherein, during operation, the processor further performs operations comprising:
- selecting the RSD where a preferred access type is included;
- registering over the preferred access type; and
- establishing, via the transceiver, a protocol data unit (PDU) session or packet data network (PDN) connection.

19. The apparatus of claim 18, wherein, during operation, the processor further performs operations comprising:
- providing information of the PDU session or PDN connection to an upper layer in an event that both the registering and the establishing are successful.

20. The apparatus of claim 18, wherein, during operation, the processor further performs operations comprising:
- informing a failure to an upper layer in an event that the registering is failed or the registering is successful but the establishing is failed; and
- deregistering from the preferred access type in an event that the establishing is failed.

* * * * *